US012383935B2

(12) United States Patent
Leighton et al.

(10) Patent No.: US 12,383,935 B2
(45) Date of Patent: *Aug. 12, 2025

(54) CLEANING APPARATUS AND METHOD, AND MONITORING THEREOF

(71) Applicant: SLOAN WATER TECHNOLOGY LIMITED, London (GB)

(72) Inventors: Timothy Grant Leighton, Southampton (GB); Christopher James Bradshaw Vian, Portishead (GB); Peter Robert Birkin, Southhampton (GB)

(73) Assignee: SLOAN WATER TECHNOLOGY LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,069

(22) Filed: Feb. 13, 2023

(65) Prior Publication Data

US 2023/0311171 A1 Oct. 5, 2023

Related U.S. Application Data

(63) Continuation of application No. 13/392,135, filed as application No. PCT/EP2010/062448 on Aug. 26, 2010, now Pat. No. 11,577,284.

(30) Foreign Application Priority Data

Aug. 26, 2009 (GB) ..................................... 0914836

(51) Int. Cl.
*B08B 3/12* (2006.01)
*B08B 3/10* (2006.01)

(52) U.S. Cl.
CPC . *B08B 3/12* (2013.01); *B08B 3/10* (2013.01)

(58) Field of Classification Search
CPC .. B08B 3/044; B08B 3/10; B08B 3/12; B08B 2203/0288; B08B 2209/005; B08B 7/02;
(Continued)

(56) References Cited

U.S. PATENT DOCUMENTS 2,098,272 A 11/1937 Benson
2,751,783 A 6/1956 Erdman
(Continued)

FOREIGN PATENT DOCUMENTS

CA 3182407 A1 12/2021
CN 101428283 A 5/2009
(Continued)

OTHER PUBLICATIONS

Apr. 22, 2022—(CN) Rejection Decision—App 201880047070.9.
(Continued)

*Primary Examiner* — Marc Lorenzi
(74) *Attorney, Agent, or Firm* — Banner & Witcoff, Ltd.

(57) ABSTRACT

An apparatus for cleaning a surface, the apparatus including a body defining a chamber, an inlet for liquid flow into the chamber, an outlet for liquid flow from the chamber, a nozzle connected to the outlet for generating an output flow of liquid for cleaning a surface, an acoustic transducer associated with the body to introduce acoustic energy into the liquid within the chamber whereby the acoustic energy is present in the liquid flowing out of the nozzle, and a gas bubble generator for generating gas bubbles within the liquid flowing out of the nozzle.

10 Claims, 9 Drawing Sheets

(58) Field of Classification Search
CPC ................. B08B 7/04; H01L 21/67051; H01L 21/67253; H01L 21/67793
See application file for complete search history.

(56) References Cited

U.S. PATENT DOCUMENTS

| | | | |
|---|---|---|---|
| 3,405,916 | A | 10/1968 | Carmichael |
| 4,103,519 | A | 8/1978 | Davidson |
| 4,444,146 | A | 4/1984 | De Witz et al. |
| 4,507,969 | A | 4/1985 | Djordjevic et al. |
| 5,001,932 | A | 3/1991 | Light et al. |
| 5,368,054 | A | 11/1994 | Koretsky et al. |
| 5,690,145 | A | 11/1997 | Kuklinski et al. |
| 6,003,527 | A | 12/1999 | Netsu et al. |
| 6,162,738 | A | 12/2000 | Chen et al. |
| 6,230,722 | B1 | 5/2001 | Mitsumori et al. |
| 6,916,296 | B2 | 7/2005 | Soring et al. |
| 7,117,741 | B2 | 10/2006 | Klein et al. |
| 7,165,563 | B1 | 1/2007 | Boyd et al. |
| 8,075,503 | B2 | 12/2011 | Jaeb |
| 10,661,314 | B2 | 5/2020 | Birkin et al. |
| 11,426,772 | B2 | 8/2022 | Birkin et al. |
| 11,577,284 | B2 * | 2/2023 | Leighton ................... B08B 3/12 |
| 2003/0106566 | A1 | 6/2003 | Danese et al. |
| 2006/0021642 | A1 | 2/2006 | Sliwa et al. |
| 2006/0060991 | A1 | 3/2006 | Holsteyns et al. |
| 2006/0191562 | A1 | 8/2006 | Nunomura et al. |
| 2007/0062555 | A1 | 3/2007 | Chang et al. |
| 2008/0017219 | A1 | 1/2008 | Franklin |
| 2008/0209650 | A1 | 9/2008 | Brewer et al. |
| 2010/0297346 | A1 | 11/2010 | Sawada et al. |
| 2012/0227761 | A1 | 9/2012 | Leighton et al. |
| 2015/0044632 | A1 | 2/2015 | Bergheim et al. |
| 2016/0325028 | A1 | 11/2016 | Locke et al. |
| 2017/0217794 | A1 | 8/2017 | Lipkens et al. |
| 2020/0164194 | A1 | 5/2020 | Leighton et al. |
| 2021/0139115 | A1 | 5/2021 | Birkin et al. |
| 2021/0387237 | A1 | 12/2021 | Leighton et al. |

FOREIGN PATENT DOCUMENTS

| | | | |
|---|---|---|---|
| CN | 101621951 | A | 1/2010 |
| CN | 201744457 | U | 2/2011 |
| CN | 102553858 | A | 7/2012 |
| CN | 102574169 | A | 7/2012 |
| CN | 103357606 | A | 10/2013 |
| CN | 204972417 | U | 1/2016 |
| CN | 107835720 | A | 3/2018 |
| CN | 110891692 | A | 3/2020 |
| DE | 4111592 | A1 | 10/1992 |
| EP | 0579275 | A1 | 1/1994 |
| EP | 0839586 | A2 | 5/1998 |
| EP | 1600088 | A1 | 11/2005 |
| EP | 2470310 | B1 | 1/2016 |
| EP | 3009202 | A2 | 4/2016 |
| FR | 2593090 | A1 | 7/1987 |
| GB | 2516652 | A | 2/2015 |
| GB | 2538276 | B | 5/2017 |
| GB | 2569136 | A | 6/2019 |
| GB | 2563212 | B | 1/2020 |
| JP | 644285 | | 1/1989 |
| JP | H3264682 | A | 11/1991 |
| JP | H0731939 | A | 2/1995 |
| JP | H08290211 | A | 11/1996 |
| JP | H0924351 | A | 1/1997 |
| JP | H09287990 | A | 11/1997 |
| JP | 2001245381 | A | 9/2001 |
| JP | 2004082038 | A | 3/2004 |
| JP | 2004167377 | A | 6/2004 |
| JP | 2005058804 | A | 3/2005 |
| JP | 2005093873 | A | 4/2005 |
| JP | 2005296884 | A | 10/2005 |
| JP | 2007311736 | A | 11/2007 |
| JP | 2007311756 | A | 11/2007 |
| JP | 2008119642 | A | 5/2008 |
| JP | 2009525867 | A | 7/2009 |
| MX | 2019014679 | A | 11/2020 |
| NZ | 760615 | A | 11/2021 |
| RU | 2565705 | C2 | 10/2015 |
| SU | 929236 | A1 | 5/1982 |
| WO | 2009037930 | A1 | 3/2009 |
| WO | 2011023746 | A2 | 3/2011 |
| WO | 2016180978 | A1 | 11/2016 |
| WO | 2018228848 | A2 | 12/2018 |
| WO | 2019110771 | A1 | 6/2019 |
| WO | 2021250645 | A3 | 2/2022 |

OTHER PUBLICATIONS

Apr. 8, 2022—(CA) 2nd Office Action—App 3,084,868.
May 16, 2022—(GB) Examination Report—App 1720342.3.
Jan. 13, 2023—(CA) 3rd Office Action—App 3,084,868.
Mar. 11, 2019—(WO) International Search Report and Written Opinion—App PCT/EP2018/083892.
M. Salta et al, "Bubbles versus biofilms: a novel method for the removal of marine biofilms attached on antifouling coatings using an ultrasonically activated water stream", Surface Topography: Metrology and Properties, 4 (2016) 034009; 11 pages; iopscience.iop.org.
Aug. 20, 2015—(GB) Search Report—App GB1508167.2.
Nov. 14, 2017—(WO) IPRP—App PCT/2016/060911.
Oct. 17, 2016—(WO) ISR & WO—App PCT/EP2016/060911.
Nov. 24, 2020—(AU) Examination Report No. 1—App 2018285022.
Nov. 25, 2020 (NZ) Patent Examination Report 1—App 760615.
Jan. 22, 2020—(EP) Office Action—App 18738198.3.
Jan. 15, 2016 (EP) Search Report—App 15196928.4.
Dec. 24, 2009—(GB) Search Report—App GB0914836.2.
May 5, 2011—(WO) International Serch Report—App PCT/EP2010/062448.
Jan. 14, 2015—(CN) Office Action—App 201080045751.5 (Eng trans).
Aug. 15, 2014—(JP) Office Action—App 2012-526053 (Eng Trans).
Sep. 23, 2014—(RU) Office Action—App 2012111316—(partial Eng trans).
Jan. 26, 2016—(EP) Partial Serach Report—App 15196928.4.
Dec. 17, 2020—(CN) Office Action—App 201680041121.8 (Eng trans).
Jan. 21, 2021—(CN) Office Action—App 201880047070.9.
Jun. 18, 2021 (NZ) Patent Examination Report 2—App 760615.
Jul. 29, 2021—(CA) Office Action—App 3,084,868.
Sep. 28, 2021—(CN) Office Action—App 201880047070.9.
Dec. 9, 2021—(GB) Office Action—App 1720342.3.
Jan. 4, 2022—(EP) Examination Report—App 16722257.9.
Feb. 17, 2022—(GB) Examination Report—App 1720342.3.
Jul. 30, 2018—(IN) Examination Report—App 2699-CHENP-2012.

* cited by examiner $t_d$ = delay time. This is chosen to get bubbles from electrochemical generator to surface to be cleaned. This can vary with flow rate and distance to target (surface, pipe wall etc.)

CLEANING APPARATUS AND METHOD, AND MONITORING THEREOF

CROSS-REFERENCE TO RELATED APPLICATIONS

This application is a continuation of U.S. patent application Ser. No. 13/392,135, filed May 16, 2012, which is a national stage application under 35 U.S.C. § 371 of International Application No. PCT/EP2010/062448, filed Aug. 26, 2010, which claims priority to United Kingdom Application No. 914836.2, filed Aug. 26, 2009, all of which prior applications are incorporated by reference herein in their entireties.

FIELD OF THE INVENTION

The present invention relates to a cleaning apparatus and to a cleaning method, and to a method of monitoring cleaning.

BACKGROUND

Cleaning is an essential part of many research, commercial and public service processes, three obvious examples being manufacturing, healthcare, and laboratory work. Cleaning is often not simple: the object to be cleaned may be complicated, with many inaccessible crevices or chambers, and the potential contaminant very hazardous (a good example being the biopsy endoscope). The object to be cleaned may also be delicate (a good example of this being salad and vegetable matter, microchips, flesh, forensic material etc.) or tolerate minimal levels of scratching and damage (such as optical lenses, jewelry, prestige watch glasses and faces or prestige car finishes). Often the time available for cleaning is limited, as there is an imperative to move the object along to the next stage of processing or usage after it is cleaned (either because the number of units available for use is limited—as with the endoscope—, or because retardation of through-put cuts profile—as in the salad example).

Cleaning uses up huge amounts of water, even for 'natural' products: the production of 1 tonne of wool currently requires use of around 500 tonnes of water. When one considers the biohazardous waste of a hospital or abattoir, or the cleaning associated with chemical and nuclear plants, water conservation becomes a very major concern. The requirement for thorough cleaning is often in conflict with the requirements not to damage the target to be cleaned, not to use excessive water, not to contaminate the environment with chemical run-off, and not to use excessive energy or manpower or time.

Ultrasonic cleaning has been known in the art for many years, by the use of 'ultrasonic cleaning baths', whereby inertial cavitation and the generation of high speed liquid jets through bubble involution causes the removal of surface contaminants. The exploitation of cavitation in ultrasonic cleaning baths has for decades provided ultrasonic cleaning facilities that are suitable for those applications which have had robust objects to be cleaned (i.e. where cavitation erosion damage is not an issue), and where the size of the object to be cleaned is small enough to be immersed, and where the cleaning lacks the urgency which would necessitate a portable decontamination unit to supply on-the-spot cleaning resulting from, say, accidental contamination. In many instances of such cleaning, samples are either cleaned prior to further processing or dispersed within a suitable media as part of a larger methodology. Cleaning or processing is then facilitated by the employment of an ultrasonic bath. This invariably involves the immersion of a suitable container within the bath.

The cleaning action is often attributed to the generation of violent cavitation within the vessel itself and the interaction of these phenomena with the walls of the object in question. Cleaning action is attributed to cavitation events where the inertia of the liquid has had a dominant effect on the bubble dynamics, e.g. when a high-speed liquid jet passes through the bubble as a result of involution of the bubble wall and generates a blast wave on impact with liquid or solid; when bubbles collapse with almost spherical symmetry in 'transient' or 'inertial' cavitation events, generating shock waves in the liquid and highly reactive chemical species such as free radicals; and when clouds of bubbles collapse in a concerted manner to magnify these effects to become greater than would be expected without the cloud effect. Hence the exact mechanism is often associated with 'transient cavitation' or more precisely inertial cavitation where the violent collapse phase results in the local generation of these extreme conditions.

However, such ultrasonic cleaning systems may suffer from one or more problems of surface damage, poor cleaning, particularly of three dimensional surfaces, e.g. crevices, and an inability to clean larger objects or surfaces. Furthermore the insertion of the object to be cleaned into an ultrasonic cleaning bath may disturb the sound field in a manner which degrades its ability to cause cleaning.

SUMMARY OF THE INVENTION

The present invention aims at least partially to overcome these problems of known surface cleaning processes, particularly ultrasonic cleaning.

The present invention provides an apparatus for cleaning a surface, the apparatus comprising a body defining a chamber, an inlet for liquid flow into the chamber, an outlet for liquid flow from the chamber, a nozzle connected to the outlet for generating an output flow of liquid for cleaning a surface, an acoustic transducer associated with the body to introduce acoustic energy into the liquid within the chamber whereby the acoustic energy is present in the liquid flowing out of the nozzle, and a gas bubble generator for generating gas bubbles within the liquid flowing out of the nozzle.

Preferably, the bubble generator comprises electrodes which are adapted to generate gas bubbles electrolytically within the liquid. Typically, the electrode comprises an array of electrically conductive wires extending across a direction of liquid flow.

Optionally, the gas bubble generator is located within the nozzle.

The apparatus may further comprise a first controller for the gas bubble generator which is adapted to control the gas bubble generator to generate pulses of gas bubbles.

The apparatus may further comprise a second controller for the acoustic transducer which is adapted to control the acoustic transducer to generate pulses of acoustic energy. Preferably, the second controller is adapted to switch the acoustic transducer on and off intermittently to produce pulses of acoustic energy. The apparatus may further comprise a modulator to provide an amplitude or frequency modulation of the pulses of acoustic energy.

Preferably, the first and second controllers are coordinated so that gas bubbles and pulses of acoustic energy are generated with a mutually controlled time relationship.

This coordination ensures that sound and bubbles can occur at the same time at a surface location to be cleaned.

Their relative on/off timings at the nozzle can be varied to achieve this occurrence by taking into account the different travel times of sound and bubbles down the liquid, which may be a stream, and this depends on the length of liquid between the nozzle and the surface to be cleaned. The sound travels through the at a velocity of over 1 km/second whereas the bubble velocity is related to the flow rate of the liquid. Once the sound is on, it can then also be amplitude or frequency modulated. Accordingly, in accordance with this particular preferred implementation, it is possible to coordinate in timing of the two effects: the sound field is turned off entirely while the bubble swarm is generated and transferred to the surface. Once the swarm has reached the surface the sound field is activated. This sound field can be continuous or amplitude or frequency modulated.

The sound field is off whilst the bubbles travel down the stream in order to prevent coalescence of bubbles whilst they travel. This is the simplest implementation to control the sound. However, for some applications (e.g. with small volumes of water and the correct higher levels of surfactant) it may not be necessary to turn the sound field off entirely whilst the bubbles travel down the stream. and other implementations may be used, e.g. switching the sound to much higher frequencies.

Preferably, the body includes a rear wall on which the acoustic transducer is mounted and a substantially conical element extending forwardly therefrom to form a relatively small radius end thereof communicating with the outlet, the rear wall and the substantially conical element defining a substantially conical chamber of decreasing radius extending from the transducer towards the outlet. The substantially conical element may be geometrically conical, or alternatively may have a non-geometric shape, such as being horn-shaped or bell shaped. The substantially conical element may be formed, for example, of cellular foam or rubber. Other materials may be employed. The choice of material is determined by the requirement to match (as closely as practicable) the acoustic wall boundary conditions within the cone to those in the nozzle and liquid stream once it leaves the nozzle, so as to avoid sharp impedance mismatches between cone, nozzle and liquid stream that would hinder the passage of acoustic energy along the stream.

Furthermore, a design principle employed by the chamber and nozzle used in the preferred embodiments of the present invention is that the acoustic boundary condition on the inner wall of the chamber and nozzle should match the acoustic boundary condition that will occur in the stream of liquid once it leaves the nozzle. The embodiments disclosed herein produce a stream of liquid in free air, and hence the inner wall of the chamber needs to be pressure-release, and so a pressure-release material such as cellular foam or rubber has been used to provide such a pressure-release boundary. If, however, in accordance with an alternative embodiment of the present invention a cleaning jet of liquid (e.g. water) was not directed into air but instead squirted into another article to be cleaned, for example up a pipe, e.g. for cleaning an endoscope of narrow internal diameter, that embodiment would use a chamber with an internal wall condition matched to the respective acoustic boundary condition of the article, and a pressure-release characteristic may not be required.

The apparatus may further comprise an inlet manifold which comprises a plurality of inlet passages each connected at an inlet end to the inlet and at an outlet end to the body and/or an acoustic isolation device in the inlet.

The apparatus may also include a device for adding surfactant to the liquid.

The present invention further provides a method of cleaning a surface, the method comprising the step of: directing towards the surface a liquid flow from a nozzle, the liquid flow including acoustic energy and entrained gas bubbles within the liquid flowing out of the nozzle.

The surface may be an external surface or an internal surface, for example of a cavity. The liquid flow may be directed against the surface or into the vicinity of the surface, for example by squirting the liquid up the inside of a tube (e.g. an endoscope) or pipe, such as drinks dispenser nozzle.

The method may further comprise the step of generating gas bubbles electrolytically within the liquid.

Preferably, the gas bubbles are generated within or at a distance from a free end of the nozzle. For example, it was found that if the gas bubble generator, e.g. electrolytic wires generating the gas bubbles, was positioned a small distance, such as about 1 cm, from the nozzle tip, the stability of the fluid stream was increased.

Preferably, the gas bubbles are generated intermittently.

The method may further comprise the step of generating pulses of the acoustic energy.

Furthermore, the acoustic energy within the pulses may be frequency or amplitude modulated.

Preferably, the liquid flow impacts the surface with waves of bubbles and pulses of acoustic energy which substantially simultaneously reach the surface.

Preferably, the acoustic energy is introduced into the liquid by an acoustic transducer as the liquid flows through a substantially conical chamber of decreasing radius extending from the transducer towards the nozzle.

Such a conical chamber is not essential, and other chamber shapes, for example of constant cross-section, formed by a body such as a cylindrical pipe, may be used in certain applications.

Preferably, a liquid input flow into the chamber is divided into a plurality of parallel flows by an inlet manifold which comprises a plurality of inlet passages each connected at an inlet end to the inlet and at an outlet end to the chamber.

The method may further comprise acoustically isolating an inlet conduit of the chamber from the acoustic transducer.

The present invention further provides a method of cleaning a surface, the method comprising the step of providing gas bubbles at the surface and employing modulated acoustic energy to generate surface waves in the bubbles to cause non-inertial collapse of the bubbles.

Preferably, the bubbles and acoustic energy are in a liquid flow directed towards the surface.

Typically, the surface includes at least one cavity, recess or pore and the bubbles are dimensioned to be able to enter at least one cavity, recess or pore.

Preferably, the acoustic energy excites the surface of the bubbles when the bubbles are located in the at least one cavity, recess or pore.

Preferably, the bubbles and acoustic energy are directed to the surface as pulses so that the pulses of bubbles and acoustic energy are incident on the surface substantially simultaneously.

The present invention is at least partly predicated on the finding by the present inventors that when ultrasonic cleaning is carried out, it is not necessary for cleaning that inertial cavitation is generated. The preferred embodiments of the present invention provide a cleaning apparatus adapted to achieve surface cleaning (decontamination) by the employment of bubble action on a surface (or within a crevice within a surface) driven by acoustic stimulation. This avoids inertial collapse at the interface and hence the associated parasitic erosion mechanisms of known ultrasonic cleaning systems and methods. However, it is possible optionally to generate inertial cavitation in accordance with some embodiments of the present invention if the surface to be cleaned is sufficiently robust.

Without being bound by theory, it is believed that in accordance with the preferred aspects of the present invention, the motion of the bubble process is dominated by the pressure within the gas phase which results in non-inertial cavitation, rather than the converging inertia of the liquid which results in inertial collapse. The cleaning can be further enhanced by the establishment of surface waves on the bubble wall (also sometimes referred to as bubble shape oscillations). Therefore the apparatus and method of the present invention are preferably adapted to produce bubbles remote from, but close to, the solid/liquid interface of the object to be cleaned and then to drive them against that surface with an appropriate sound wave sufficient to produce non-inertial collapse and, if applicable, surface waves on the bubble wall.

However, as described above, for some particularly robust surfaces inertial collapse may additionally be achieved at the surface which may provide enhanced cleaning without excessive damage to the surface.

A further feature of the preferred embodiments of the present invention is to deliver such cleaning ability, using non-inertial cavitation, through a liquid stream or hosepipe/tap output, which avoids the need for immersion, and so makes the apparatus portable. This may be achieved by a suitable adaptation of existing cleaning systems which currently use hosepipes or taps to deliver a flow of cleaning fluid. Such an apparatus of the preferred embodiments of the present invention system may also conserve water and/or power compared to a known immersion system.

The preferred embodiments of the present invention can provide apparatus and methods which employ a novel application of the excitation of gas bubbles within liquids with the ultimate aim of surface decontamination. Substantially any surface may be cleaned in accordance with the invention, ranging from internal or external surfaces, hard or soft surfaces, inorganic objects (e.g. an endoscope), organic or living bodies, including foodstuffs. (e.g. wrinkles on a lettuce), the human skin (e.g. under the fingernails of a surgeon), using portable or fixed hoses and taps (e.g. for forensic, autopsy, archaeological examinations). The surface for decontamination might include buildings, facilities, infrastructure (e.g. abattoirs, hospital wards, surgeries), and associated objects contained within those (personnel, keyboards, telephones etc.), or used outside. In particular, those apparatus and methods employ targeted excitation of bubbles at the surface of an interface or within a pore, cavity, recess, crevice, pipe, tube or chamber. These bubbles have been shown to do useful work including the cleaning the surface, pore, cavity, recess or crevice within the surface, or cleaning in a pipe, tube or chamber. As such this represents a new and powerful method to clean a wide variety of surfaces.

In particular, the present invention is at least partly based on the findings by the present inventors that surface cleaning may be achieved through the generation of bubble oscillation (including surface waves) driven by appropriate acoustic excitation. Also, crevice cleaning may be achieved through bubble capture into pores and other surface features, including, but not restricted to, capture through processes of flow, hydrodynamic effects, or acoustic radiation forces. These bubbles oscillate and remove material from the crevice. The acoustic excitation of these events may be achieved along a flowing stream of liquid. Bubble population effects may be harnessed to allow transmission of sound down through the liquid to the surface to be cleaned. The flow apparatus, geometry, materials and acoustic characteristics of the bubble population may allow efficient acoustic transfer to the surface to be cleaned. Relatively loge flow rates may be deployed, minimising cleaning solution wastage.

As an additional preferred mechanism to generate bubbles, electrochemical bubble seeding technology has been developed and exploited. Pulsed bubble generation (creating a bubble swarm) in tandem with pulsed acoustic excitation may generate 'active' bubbles on the surface to be cleaned. An amplitude or frequency modulated sound field, coupled with the acoustic energy optionally being switched on and off, may be employed to maximise the acoustic pressure delivered by the apparatus to the interface in the presence of a suitable bubble swarm. Pulsed bubble generation and pulsed acoustic excitation may be independently controlled so that at the nozzle bubble generation is independent of the generation of a pulse of the acoustic excitation, and such independent control can vary the bubble pulses and the acoustic energy pulses independently so that at the surface to be cleaned the bubbles and the acoustic energy pulse can be incident on, or in the vicinity of, the surface substantially simultaneously to enable efficient cleaning of the substrate by the acoustic energy causing non-inertial cavitation of the bubbles at or in the vicinity of the surface.

Such pulsing of the acoustic energy does not need necessarily to turn the sound field off between pulses, but instead may modulate the acoustic energy, by amplitude or frequency modulation, it to provide high energy acoustic pulses separated by low energy background.

In some embodiments, the sound is turned off as the bubble swarm travels down the stream (to prevent acoustically-induced bubble coalescence), and then the sound is turned on to provide a modulated acoustic energy pulse once the bubble swarm reaches the surface to be cleaned. Once these bubbles have undertaken some cleaning and started to disperse in the flow, the sound is turned off and another swarm of bubbles is generated at the nozzle and the process is repeated.

The independent control can be achieved by taking into account the fact that sound travels down the liquid stream at a different speed to the bubbles. The timing of the current supplies used to generate bubbles and sound is such as to ensure both bubble swarm and ultrasound arrive at the surface at the same time. Given this criterion, the different transit times of bubbles and sound down the tube dictate the timing for the activation of the currents which generate sound and bubbles, such that their activations may be staggered if the timing so dictates. The underlying technical concept is to utilise their different transit times down the liquid stream to ensure that the bubbles and acoustic energy occur at the same time at the surface which is to be cleaned.

In addition, novel electrochemical techniques may be used to monitor the degree of in situ cleaning as a result of fluid flow and bubble action on the surface. The invention may also include apparatus for monitoring the efficacy of the cleaning through the use of sensors close to the location where the surface to be cleaned is to be placed, or embedded in that surface.

Accordingly, the cleaning apparatus may further comprise a device for monitoring the cleaning of the surface, the device comprising first and second electrodes, forming an electrochemical cell, adapted to be respectively located at a portion of the surface and interconnected by a resistance measuring apparatus.

The present invention further provides a method of monitoring the cleaning of a surface, the apparatus comprising locating first and second electrodes, forming an electrochemical cell, at respectively portions of a surface to be cleaned and measuring the resistance therebetween.

Typically, the first electrode is located in a cavity, recess or pore to be cleaned and the second electrode is located on an external portion of the surface.

Preferably, the method comprises determining a decrease in the resistance to indicate cleaning of the cavity, recess or pore.

For the apparatus of the preferred embodiments of the present invention, the nozzle material and shape, and the driving acoustic frequency, may be chosen such that at least one mode is not evanescent in the liquid stream. The nozzle may be designed to prevent a strong impedance mismatch between the sound field in the conical body and the sound field in the liquid stream. For some applications (for example if the liquid stream is surrounded by gas once it leaves the nozzle) a specific (but not exclusive) preferred manifestation of this is in use of materials which are exactly (or nearly) pressure-release in the construction of the nozzle and/or conical body. The flow rate and nozzle design may be chosen so that the liquid stream does not lose integrity before it reaches the target surface to be cleaned (e.g. break up into drops, entrain unwanted bubbles, etc.) to the extent that it hinders the transmission of sound from the nozzle to the target. The shape of the conical body may be designed to assist the transmission of sound from the cone to the liquid stream and subsequently through the nozzle. An amplitude or frequency modulated sound field may dramatically improve pressure transmission within the fluid flowing through the apparatus to the target substrate.

BRIEF DESCRIPTION OF THE DRAWINGS

Embodiments of the present invention will now be described by way of example only, with reference to the accompanying drawings, in which.

DETAILED DESCRIPTION

Figure 1:
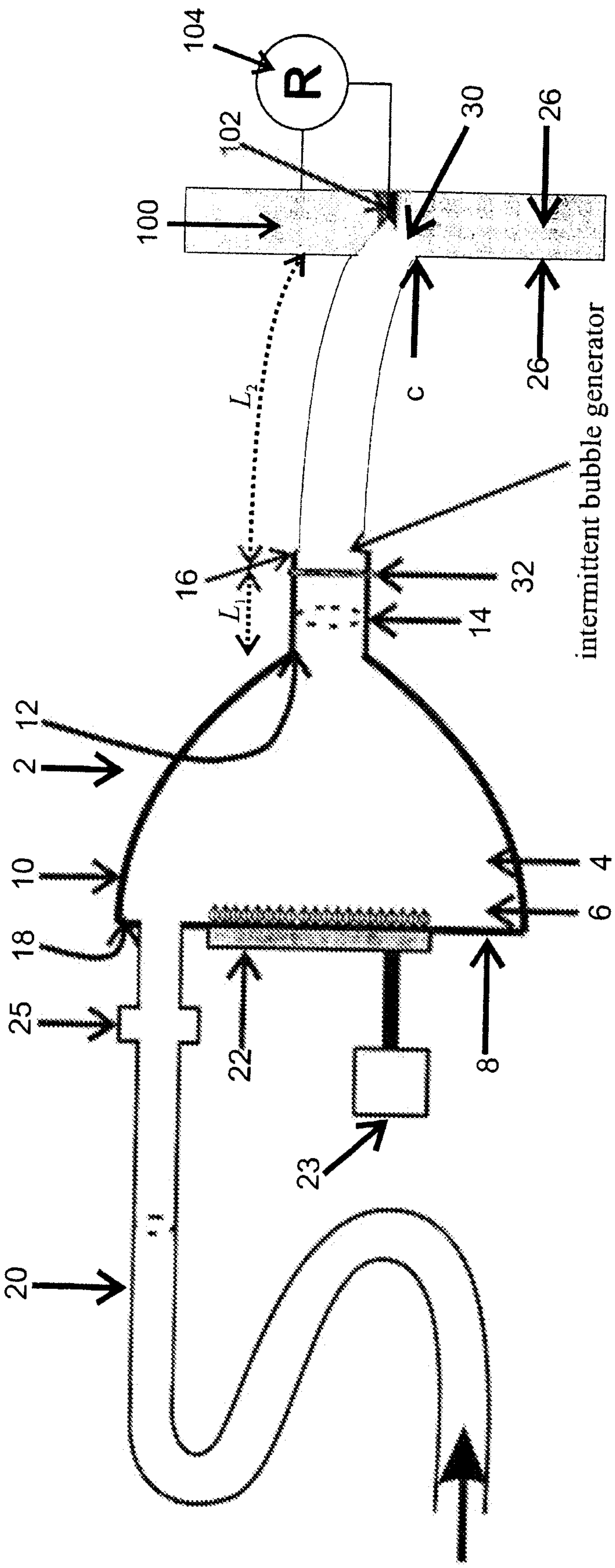
FIG. 1 is a schematic side view of a cleaning apparatus in accordance with a first embodiment of the present invention.

Referring to FIG. 1, there is shown a cleaning apparatus in accordance with a first embodiment of the present invention.

Figure 2:
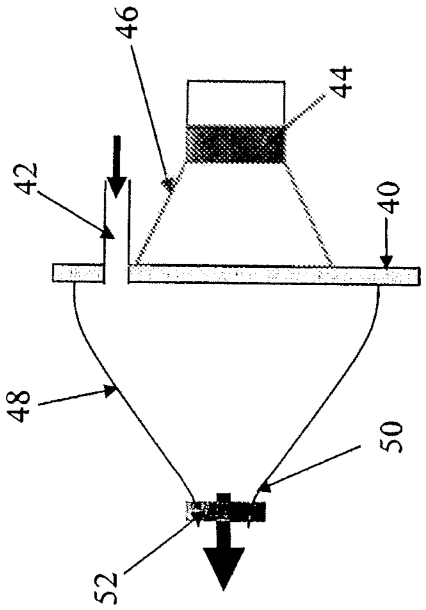
FIG. 2 is a schematic side view of a cleaning apparatus in accordance with a second embodiment of the present invention.
Figure 4:
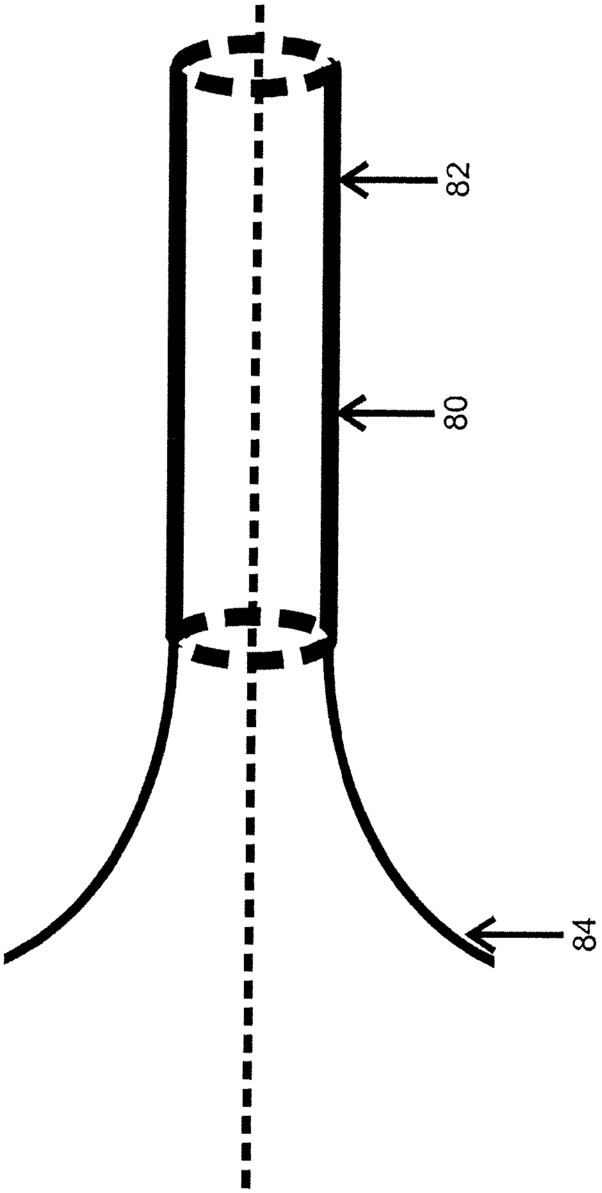
FIG. 4 is a schematic view of an alternative shape for the cone for use in any of the embodiments of the cleaning apparatus of the present invention.

The cleaning apparatus, designated generally as 2, comprises a hollow body 4 defining a central chamber 6. The body 4 has a rear wall 8 and a substantially conical element 10 extending forwardly away therefrom which terminates in a forwardly-located orifice 12. Typically, both the element 10 and the wall 8 are rotationally symmetric, i.e. circular, although other geometric shapes may be employed. In this specification the term "substantially conical" should be interpreted broadly to encompass structures which are not only geometrically conical, but also structures which for example are bell-like, having a concave inner wall as seen from inside, as shown in FIG. 1, or have a constant half-angle as shown in FIG. 2, or are horn-like as shown in FIG. 4 (i.e. has a convex inner wall as seen from the inside). Accordingly, the element 10 forms a conical body such as a bell- or horn-like structure, and for brevity may be referred to hereinafter simply as a "horn".

A nozzle 14 extends forwardly from the orifice 12 and defines a liquid outlet 16. A liquid inlet 18 is located at or adjacent to the rear wall 8. A liquid supply conduit 20, typically in the form of a flexible hose, communicates with the inlet 18. An acoustic transducer 22 is mounted on the rear wall 8. A controller 23 controls the operation of the transducer 22. Typically, the transducer 22 is mounted on an outer surface of the wall 8 and extends over a substantial proportion of the surface area of the wall 8. Alternatively, the transducer may be embedded into the chamber on or through the rear wall. Indeed to achieve a pressure-release condition in the chamber walls (e.g. the stream was to be squirted into a cavity, such as into the internal bore of an endoscope) then the apparatus may employ either a rear-wall transducer or alternatively make the inner surface of the horn comprise a transducer. It should be noted that the transducer could be mounted elsewhere such as on the walls of the horn or the nozzle, providing that it was not required, for the particular application, to match to a pressure-release boundary condition once the stream has left the nozzle (e.g. if the stream was being used to clean the inside of an endoscope).

In use, liquid flows continuously through the supply conduit 20 into the central chamber 6 and then outwardly through the outlet 16 of the nozzle 14 to form a stream 24 of liquid which is directed against the surface 26 of a substrate 28 to be cleaned. The surface 26 may, in particular, be provided with three dimensional surface features, such as a crevice 30 shown in an exaggerated form in FIG. 1.

A bubble generator 32 is located within the nozzle 14 upstream, in the direction of fluid flow, from the outlet 16. The bubble generator 32 generates gas bubbles within the liquid stream so that the liquid stream impacting on the substrate surface 26 includes not only acoustic energy from the transducer 22 but also gas bubbles.

There are several options for seeding gas bubbles into the liquid flow, including gas injection and in situ electrochemical gas bubble generation by electrochemical decomposition of water in the liquid. For in situ electrochemical gas bubble generation, the incorporation of electrodes into the structure allows controlled seeding, and is preferably achieved by threading 50-100 μm diameter Pt wires through the nozzle of the jet (~1 cm before the exit). Other options including use of one or more electrodes in the liquid flow, or in the wall of the nozzle.

Referring to FIG. 2, in this modified embodiment, the rear wall 40 consists of a plate, for example of plastic or a metal such as aluminium or stainless steel, having the liquid inlet 42 therein and the acoustic transducer 44, which may itself incorporate a truncated cone 46 is bonded or otherwise held on to the rear surface of the plate 40. The substantially conical element 48, comprising a horn, extends forwardly of the plate 40 and forms an integral nozzle 50 at which the bubble generator 52 is located.

In the embodiment of FIG. 1 the hollow body 4 may be made integral and made of a single material, with the rear wall 8 being integral with the horn 10. In this embodiment, the horn is composed of material that can function as a pressure release interface when fluid is directed thereagainst, so that acoustic energy in the material of the horn is effectively and efficiently transmitted into the flowing liquid at the inner surface of the horn. The aim of the apparatus of this embodiment is to introduce acoustic energy into the flowing fluid stream and then to direct that stream through the outlet onto the surface to be treated by using the conical shape of the horn to concentrate both the acoustic energy and the fluid flow while minimising acoustic losses or frictional loses against the conical surface.

The embodiment discussed above is directed to the specific application of introducing sound energy into the liquid stream when the liquid is surrounded by air after leaving the nozzle. That is applicable, for example, for cleaning under a surgeon's fingernails or cleaning a lettuce. However for other applications in which the liquid stream is directed into the article to be cleaned (such as cleaning up an endoscope) the liquid stream on leaving the nozzle may not have a pressure-release boundary condition, and for that embodiment a horn made of different, non-pressure release, material may be employed.

The nozzle and the outlet are shaped and dimensioned to allow for acoustic transmission along the fluid stream. It is advantageous to form a smooth flow of the stream. It is well within the abilities of a person skilled in the art to produce a suitable combination of shape and dimensions for the horn, the outlet and the inlet to achieve the desired smooth flow of liquid containing acoustic energy from the transducer.

As described above, novel electrochemical techniques may be used to monitor the degree of in situ cleaning as a result of fluid flow and bubble action on the surface.

Figure 9:
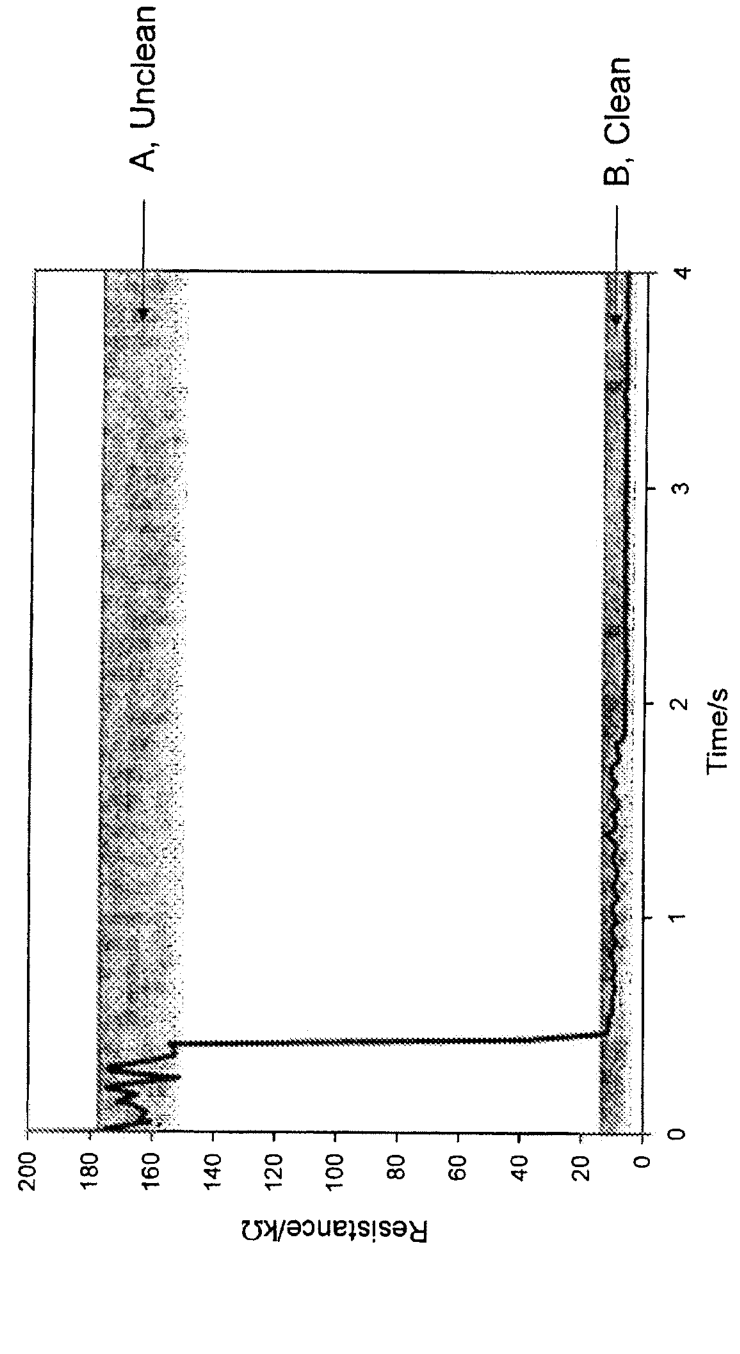
FIG. 9 shows the relationship between resistance and time, measured at a surface, either clean or unclean, for use in a method of monitoring the cleaning of a surface according to an embodiment of the present invention.

In this embodiment, the cleaning apparatus further comprises a device for monitoring the cleaning of the surface, the device comprising first and second electrodes 100, 102, forming an electrochemical cell, adapted to be respectively located at a portion of the surface and interconnected by a resistance measuring apparatus 104. In the method of monitoring the cleaning of the surface, the first electrode 100 is located on an external portion of the surface and the second electrode 102 is located in a cavity or recess to be cleaned. The resistance therebetween is measured using the resistance measuring apparatus 104 to determine a decrease in the resistance to indicate cleaning of the cavity or recess. As show in FIG. 9. an initial resistance value A changes according to value B by decreasing significantly when the monitored surface portion has been cleaned.

In this aspect of the invention, electrochemical cleaning measurements under the tip of the ultrasonic horn, using either flat, recessed or cannular electrodes, made use of an electrochemical cell consisting of two or more electrodes. The cleaning liquid acted as an electrolyte. The resistance of the fouled working electrode was monitored such that when the cavity or recess was unclean, the working electrode would have no or only poor electrical contact with the liquid electrolyte and so a relatively high resistance would exist between the two electrodes, whereas when the cavity or recess was cleaned and therefore the working electrode came into contact with the solution, a at low resistance would be measured. This provides a very effective method for quantifiably measuring the cleaning time. This method relies on the measurement of the uncompensated resistance of the system.

Therefore, if the uncompensated resistance of the system can be monitored as a function of time, it is possible to use this method to detect the cleaning of the cavity, recess or pore. This method is able to give quantifiable data on the cleaning of the cavity, recess or pore. In order to remove the effect of capacitance of the electrode a low amplitude high frequency (100 kHz, 200 mV zero to peak amplitude) alternating voltage signal was applied between the working electrode (for example a 0.5 mm diameter Pt recessed electrode) and reference electrode (normally a large piece of metallic material, for example a Cu plate). The current passed can then be used directly to determine the resistance of the system as a function of time. Using this system the only chemical required is a supporting electrolyte to make the solution conducting such as potassium chloride (KCl) or common salt (NaCl) both of which are relatively cheap and easy to dispose of. This method is used to monitor the cleaning of a surface with a variety of features designed to investigate the efficiency of targeted ultrasonic cleaning.

If the monitoring component is not needed for a particular application when carrying out the cleaning method of the invention, and only cleaning is required, then an electrolyte such as KCl or NaCl or equivalent is not necessary within the cleaning liquid.

Figure 3:
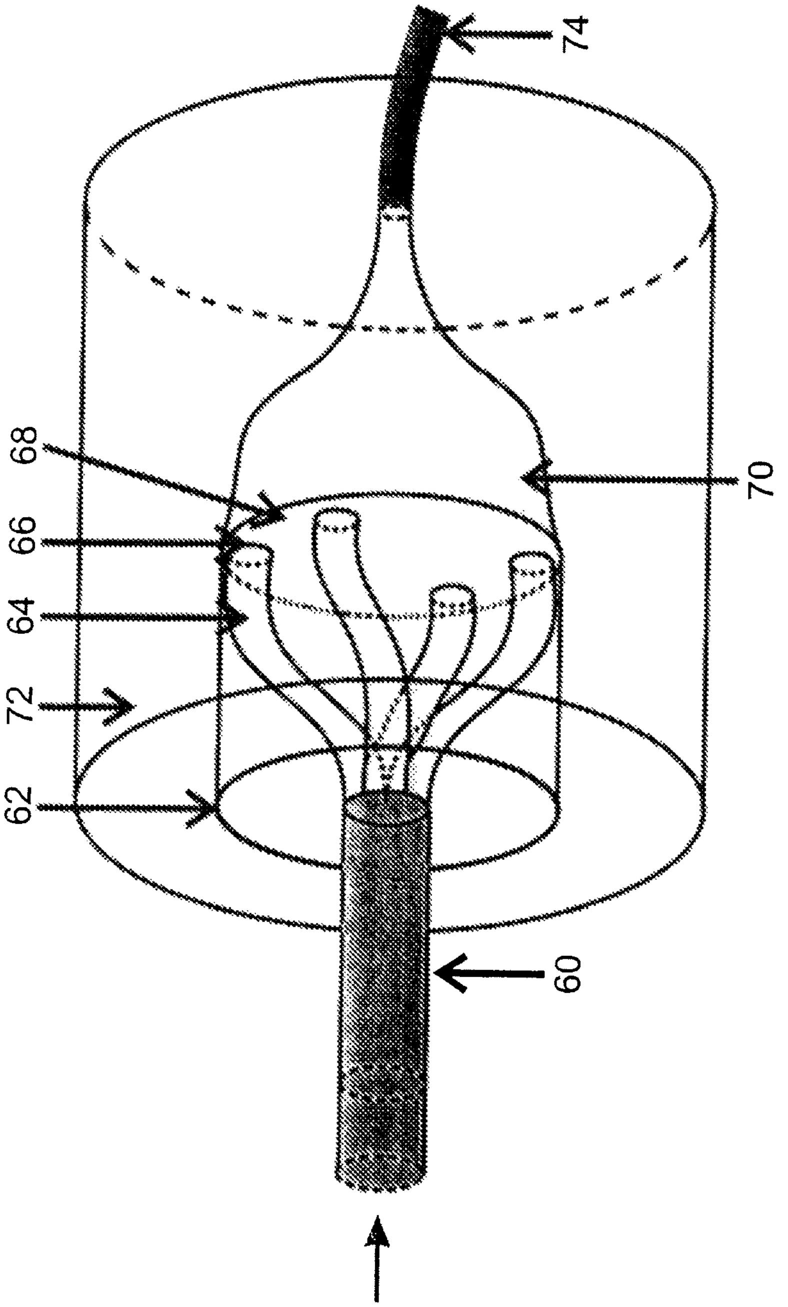
FIG. 3 is a schematic perspective view of a cleaning apparatus in accordance with a third embodiment of the present invention.

Referring to FIG. 3, in an alternative embodiment, the inlet conduit 60, in the form of a hose, is connected to a manifold 62 which divides the inlet liquid flow into a plurality of different inlet flow passages each in a respective secondary inlet conduit 64, each secondary inlet conduit 64 connecting the inlet conduit 60 to a respective inlet 66 on the rear wall 68 connected to the horn 70. The assembly of the rear wall 68 and the horn 70, and the manifold 62, may be connected together within a common housing 72. The horn 70 is connected to an outlet 74.

Referring to FIG. 4, an alternative shape for the horn 80 is disclosed, in which the horn 80 has a cylindrical downstream portion 82 and a hyperboloidal (or some other horn-shape, such as parabolic, catenoidal, etc.) outwardly flaring upstream portion 84.

It may be seen from all of FIGS. 1 to 4 that various different shapes of configurations for the horn may be employed, provided that the horn is shaped to provide a constant fluid flow outlet minimising both loss of acoustic energy and frictional losses. This would provide optimal acoustic and flow properties in the stream of fluid which impacts the surface to be cleaned. Furthermore, such a horn-shaped structure is not essential for some applications and the chamber may have any other shape, and be defined by any material of the body, that permits acoustic energy to be introduced into the fluid flow and exit from a nozzle.

If the liquid stream is to flow through gas on leaving the nozzle, and therefore the inner walls of the horn need to be pressure-release, then a particularly preferred material for the horn is a cellular foam material or a rubber which can avoid an impedance mismatch between the sound field in the horn and the sound field in the liquid stream flowing therethrough. The flow rate and nozzle design are selected so that the liquid stream does not lose integrity before it reaches the surface to be cleaned. The shape of the horn is designed to assist the transmission of sound from the horn to the liquid stream flowing through the nozzle. For example, when the horn is a cellular foam material the horn is formed by moulding a conical cavity within a solid foam block (although other manufacturing processes, such as cutting from a block, may be used).

Most typically, the horn and nozzle are rotationally symmetric.

In any of the embodiments, the inlet may be provided with an acoustic isolation device which prevents acoustic energy being transmitted back along the liquid supply conduit 20. The acoustic isolation device, shown schematically as 25 in FIG. 1, may comprise an acoustic filter, optionally having a selected frequency range, and/or a venturi narrowing in the conduit 20, and/or an expansion chamber, and/or by control of the diameter of the conduit to provide that the driving frequency is below the cut-off frequency of all modes for the inlet (as would happen for sufficiently small-bore manifold inlets made of pressure-release material).

In these embodiments, the apparatus size can be varied to provide varying volumes of the liquid stream. Smaller or larger volumes can be achieved by scaling the flow rate, nozzle size and the driving acoustic frequency, in line with the provision that at least one mode is not evanescent in the liquid stream, thereby to provide a cleaning solution stream impacted onto the surface accompanied by a suitable sound field and active bubbles. This mode may be the plane wave mode if the acoustic boundary conditions at the wall allow. In order to achieve the required volumetric flow rate, as well as enabling the flow to project to a sufficient distance beyond the free end of the nozzle, a small outlet aperture is required. Except for the plane wave mode (if the acoustic boundary conditions permit it to propagate, which is not the case if the liquid stream flows through air), then for each mode the sound transmission down the liquid jet will be undesirably restricted below a characteristic "cut-off" frequency ($F_{co}$). If the stream were to be passed into a solid tube, such that solid wall would surround the stream, then the lowest frequency mode would be plane wave and there would be no cut-off frequency for that mode, although higher order modes would have their own cut-off frequencies. In the particular case where the liquid stream flows through a gas space on leaving the nozzle, then the boundary condition at the curved walls of the stream would be pressure-release, and for such a condition the cut-off frequency ($F_{co}$) for the lowest mode is calculated according to the equation $$F_{co} = \frac{2.4048c}{2\pi a} \quad \text{(Equation 1)}$$

where c represents the velocity of sound in the fluid and a represents the liquid stream radius. For example, for a flow outlet of around 10 mm internal diameter, and assuming a speed of sound in the liquid of 1500 msec, the cut-off frequency of the liquid stream for the lowest mode would be on the order of 114 kHz (modes of higher order would have higher cut-off frequencies). However, fluid properties and any entrapment of bubbles, as discussed hereinafter, would affect this cut-off frequency. Bubbles, for example, may reduce the sound speed in the liquid, and hence reduce the cut-off frequency of the mode.

The bubble generator 32 is adapted to generate gas bubbles which are then acoustically excited and impact on the surface to be cleaned. The bubbles are driven into oscillation by the acoustic energy and can get into crevices and pores on the substrate to be cleaned, so that they effectively clean the substrate surface.

The bubble generator 32 may act directly to inject gaseous bubbles into the fluid flow, for example through a needle, the needle optionally vibrating. Other options for bubble generation include through use of cavitation (hydrodynamic or acoustic) or free-surface bubble entrainment, or chemical gas production, or by a more preferred route of electrochemical in situ generation of gas bubbles by electrolytic decomposition of the water in the liquid flow. The bubble generator 32 adapted for electrochemical bubble generation comprises an electrode comprising an array of electrically conductive wires, for example platinum wise having a diameter of 50 μm, extending across the outlet. The electrode is connected to a source of electrical energy (not shown) and, when electrically powered, the electrical energy electrolytically decomposes water in the fluid flow to generate streams of bubbles of both oxygen and hydrogen gas which are entrained in the flowing fluid and directed towards the target surface to be cleaned.

Figure 5:
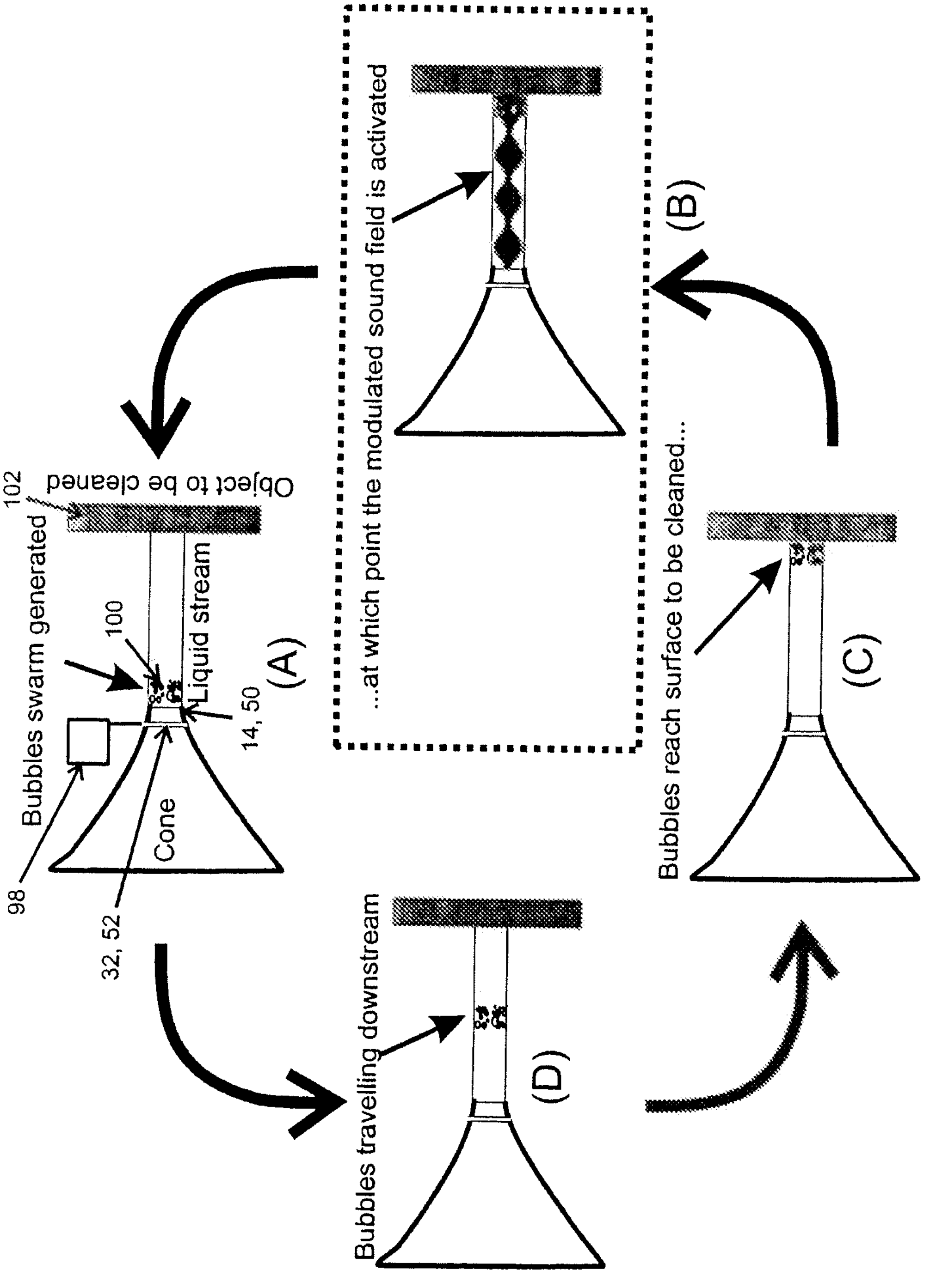
FIG. 5 is a schematic representation, as a side view, of a sequence of steps in a cleaning cycle showing the generation of acoustic energy pulses and gas bubble pulses producible by any of the embodiments of the cleaning apparatus of the present invention.

FIG. 5 shows a sequence of steps in a cleaning cycle for a respective bubble swarm.

As shown in FIG. 5(*a*), the bubble generator is controlled by a controller 98 so that bubbles are formed intermittently to form intermittent swarms 100 (or waves) of bubbles which successively impact against the surface 102 to be cleaned. When the bubbles impact the surface 102 to be cleaned, the bubbles are driven to oscillate by the acoustic energy, thereby penetrating crevices which are cleaned by the acoustic energy.

As also shown in FIG. 5, the amplitude or frequency modulated acoustic energy from the transducer is pulsed intermittently. This produces pulses of acoustic energy, which interact with the intermittent bubble swarms 100 described above, in a concerted manner. FIG. 5(*b*) shows that when the acoustic transducer is switched off, the bubble swami 100 travels downstream together with the liquid flow directed towards the surface 102. The bubble swarm 100 reaches the surface 102, as shown in FIG. 5(*c*). FIG. 5(*d*) shows that as the bubble swarm 100 reaches the surface 102, the acoustic transducer is switched on, to generate a sound field pulse, optionally amplitude or frequency modulated, which is transmitted towards the surface 102 at the speed of sound through the liquid. The acoustic energy of the pulse activates the bubbles of the swarm at the surface 102 to effect enhanced cleaning, by non-inertial collapse of the bubbles at the surface, and optionally generating surface waves in the bubbles, and/or optionally causing higher energy cleaning events (e.g. inertial collapse of bubbles, jetting etc.). This completes a cleaning cycle for a single bubble swarm. A next cleaning cycle for a subsequent bubble swarm is then initiated by generation of the subsequent bubble swarm as shown in FIG. 5(*a*).

Figure 6:
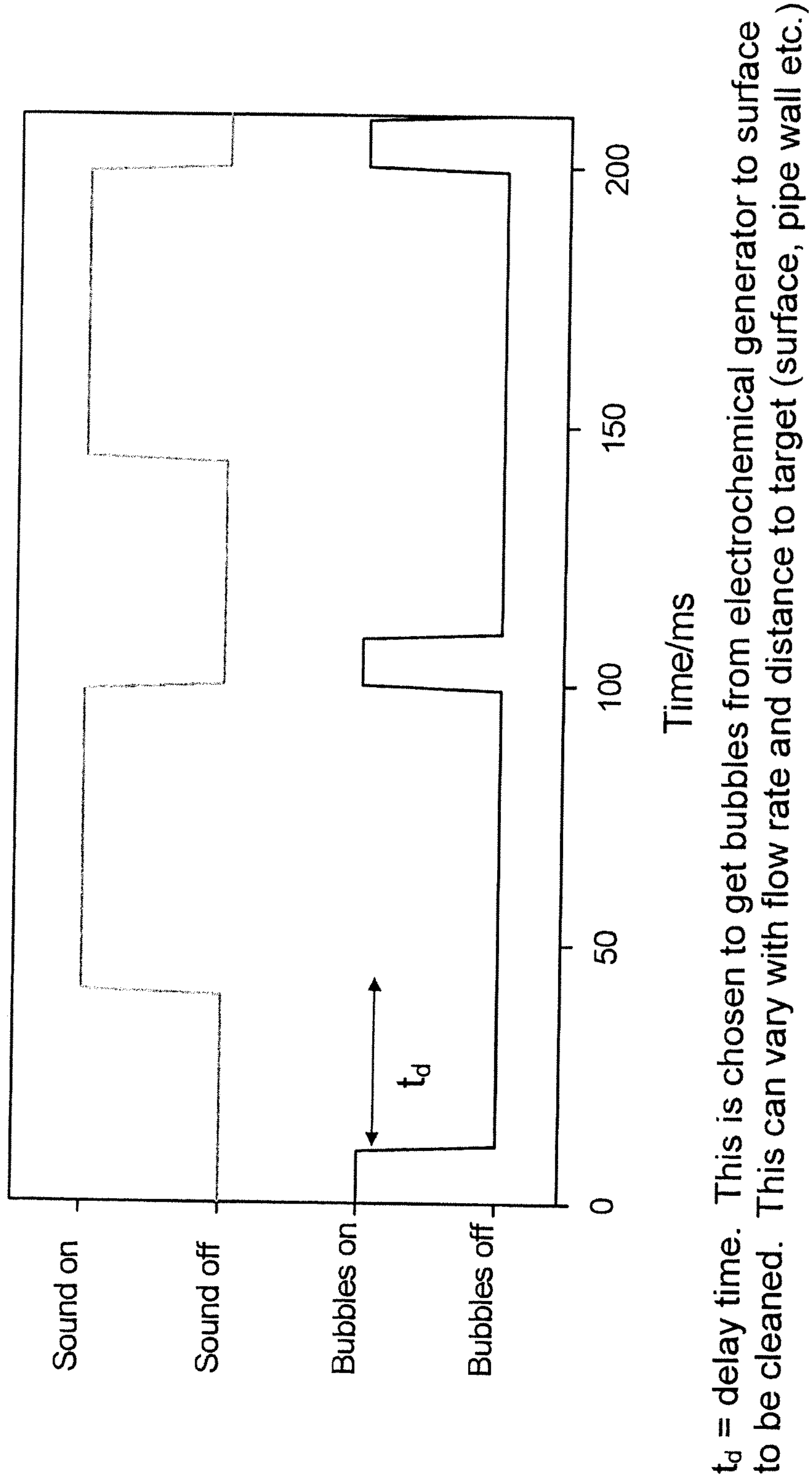
FIG. 6 shows the phase relationship between (a) acoustic energy (sound) generation and (b) bubble generation, to provide the pulses, with respect to time at the nozzle in any of the embodiments of the cleaning apparatus of the present invention, and additionally shows the acoustic energy modulation.

As shown in FIG. 6, at the nozzle there is a particular phase relationship between the generation of the sound pulse and the generation of the pulse of bubbles. The phase relationship changes as the sound and bubbles are transmitted away from the nozzle through the liquid since the acoustic energy and the bubbles are transmitted at different velocities through the liquid towards the surface to be cleaned. The aim is to provide a phase relationship, which typically involves a delay time $t_d$ between bubble generation and generation of the pulse of the acoustic energy, so that the acoustic energy and the bubbles reach the surface to be cleaned in phase and at the same time. In the example illustrated, a delay time $t_d$ is provided which would vary with flow rate and distance to the target.

In this embodiment the sound is turned off during bubble generation and bubble transfer to the surface to be cleaned. The excitation of these bubbles is intermittent, and in synchronism with the intermittent on/off nature of the electrochemical bubble generation. In the embodiment of FIG. 6, the bubbles may be generated for a generation period, typically 10 milliseconds, with a periodicity of 100 milliseconds. After the termination of each bubble generation, there is a delay, typically 30 milliseconds, after which the sound is turned on (or, in other embodiments, modulated to provide a high energy pulse) for a period of 60 milliseconds. The sound is then turned off and simultaneously the bubbles are turned on, in a subsequent cleaning cycle.

These values apply to one particular device, but would be longer or shorter if the device was larger or smaller in size respectively. This delay is flow rate and distance dependent. It can be variable and, for example, if a long pipe (endoscope) is the cleaning target, the delay can be varied to achieve cleaning at different positions along the liquid flow direction.

Within each acoustic energy pulse, the acoustic energy is amplitude or frequency modulated, as also shown in FIG. 6 (amplitude modulation being exemplified by varying the driving voltage of the transducer). The modulation period, which is frequency dependent, is typically 1 millisecond.

Figure 7:
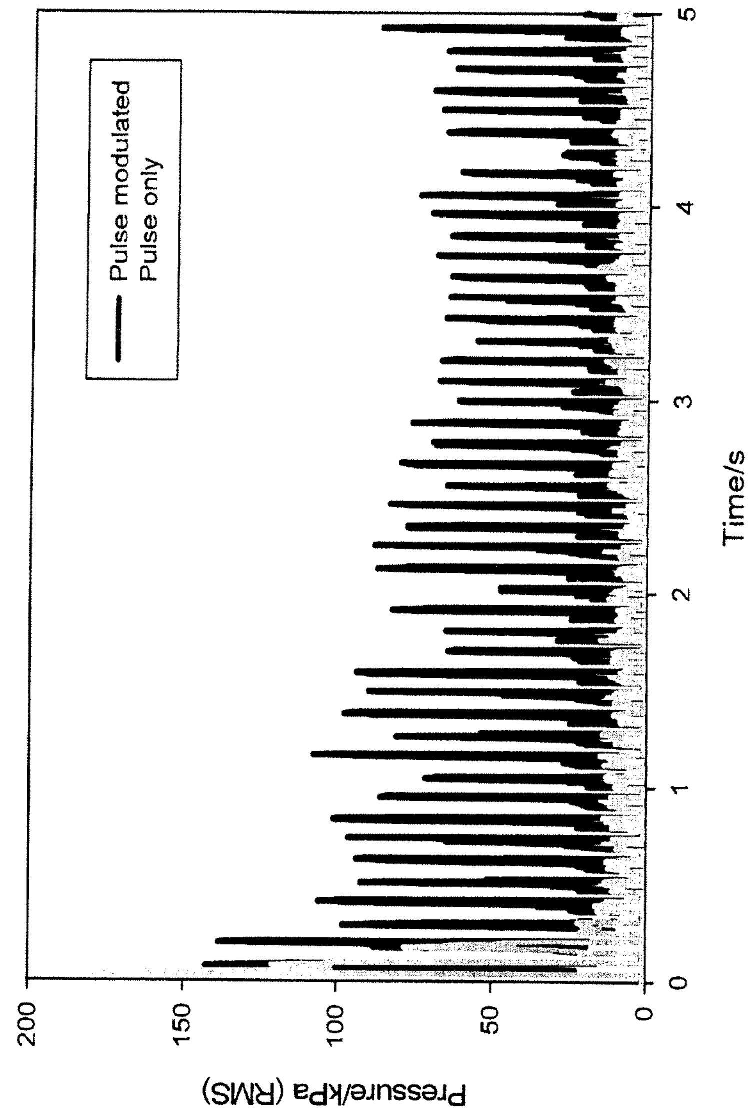
FIG. 7 shows the acoustic pressure signal recorded at the target surface for a modulated and unmodulated pressure sequence using the duty cycle shown in FIG. 6.

As shown in FIG. 7, the pulsed generation of such bubble swarms causes modulated pressure to be applied to the cleaned surface by each bubble swarm when the respective bubble swarm impacts the surface to be cleaned. Such modulated pressure typically occurs every 100 milliseconds. As explained earlier, each bubble swarm is oscillated by the acoustic energy which produces a cleaning effect.

Figure 8:
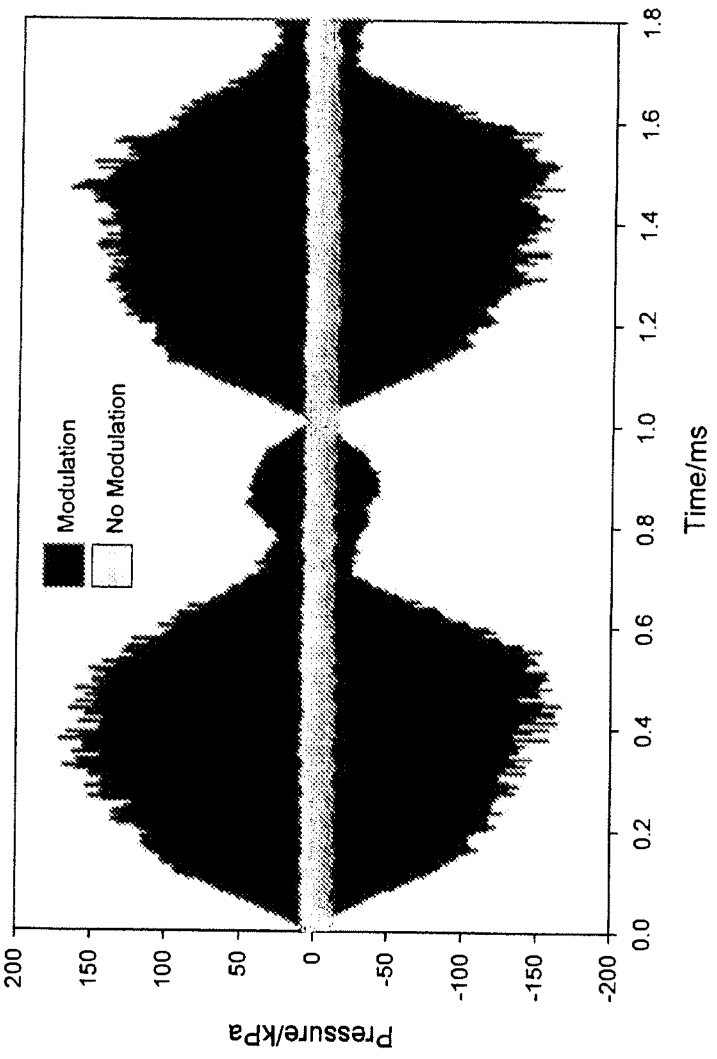
FIG. 8 shows the relationship between pressure and time, measured at a hydrophone, generated by the acoustic energy, either in continuous or modulated mode, in the cleaning apparatus of any of any of the embodiments of the present invention.

FIG. 8 shows pressure at a hydrophone for a constant drive acoustic field, either in continuous mode or modulated mode. As shown by FIG. 8, when a constant acoustic energy impacts on the surface, the pressure generated at the surface is relatively low and constant, whereas when modulated waves of acoustic energy impact the surface, the maximum energy released at the surface by each wave is significantly greater.

Therefore by employing pulsed bubble generation and pulsed generation of acoustic energy in a coordinated manner, bubbles are excited at the surface so that bubbles are present at the surface when the acoustic energy is also at the surface, and furthermore the cleaning impact achieved by both the bubbles and the acoustic energy is increased by additionally providing that the acoustic energy is amplitude or frequency modulated at a higher frequency that the pulses, greatly improving cleaning efficacy. The presence of a bubble swarm formed between a pair of acoustic energy pulses separates those acoustic energy pulses. Each bubble swarm is independently impacted on the surface to be treated and independently excited by the acoustic energy of the succeeding acoustic energy pulse.

In accordance with a further aspect of the apparatus and method of the present invention, it has been found that the addition of a surfactant to the liquid can affect the bubble size achievable without bubble coalescence. Sufficient surfactant may be added, if necessary, to prevent coalescence of bubbles as they flow down the stream if, without surfactant, such coalescence produces bubbles too large for appropriate cleaning; but not so much surfactant that the bubbles are too small for cleaning when they reach the site.

The following Table 1 shows how the bubble size (estimated from high-speed camera experiments) is affected by the surfactant loading, and how the activity, defined as erratic bubble motion across a surface, which is indicative of bubble oscillation by acoustic energy, varies with bubble diameter.

TABLE 1

| Total surfactant/μl | Concentration/ % by vol | Bubble diameter/μm | Comment |
|---|---|---|---|
| 0 | 0 | 190 | Bubbbles Coalesce |
| 20 | 0.0004 | 140 | Some activity |
| 40 | 0.0008 | 75 | Low activity |
| 100 | 0.002 | 50 | Low activity |
| 150 | 0.003 | 40 | High activity |
| 250 | 0.005 | 40 | High activity |
| 500 | 0.01 | 45 | High activity |
| 750 | 0.015 | 40 | High activity |
| 1000 | 0.02 | 25 | Low activity |
| 2000 | 0.04 | 25 | Reduced activity |
| 5000 | 0.1 | 15 | Activity too small to detect |

The range of total surfactant volume of from 150 to 750 μl to give a surfactant concentration of from 0.003 to 0.015% by volume resulting in a bubble diameter of from about 40 to 45 μm provided the conditions where highest cleaning activity was observed. The particular total surfactant and surfactant concentration values to achieve the desired bubble activity may be dependant on the type of surfactant employed.

Without being bound by any theory, nevertheless the present inventors have found that a number of phenomena are relevant to achieving effective ultrasonic cleaning.

First, when bubbles were observed within a pore, cavity or crevice of a surface to be cleaned, the bubbles were noted to oscillate in the ultrasonic field, and such oscillation is believed to play a key role in the decontamination of these more complex surfaces. Although such pulsation oscillations may have a cleaning effect, the present invention is additionally, and importantly, predicated on using surface waves on the bubble wall to provide a cleaning effect.

Second, it was found that the sound field plays an important role in trapping bubbles in such a pore, cavity or crevice, because although bulk flow can transport bubbles from one region of the liquid towards the solid surface, the acoustic excitation causes the additional benefit of attracting the bubble into the crevice and trapping it there by radiation forces, and furthermore of inducing net size increase of appropriate bubbles in pores though degassing and rectified diffusion. As such, the use of acoustic fields offers a significant advantage over the use of flowing liquid alone.

Of course, ultrasonic cleaning has been in use for many years in 'ultrasonic cleaning baths', whereby inertial cavitation and the generation of high speed liquid jets through bubble involution causes the removal of surface contaminants.

However, in accordance with the preferred aspects of the present invention and as found by the inventors in their experimental studies, the cleaning does not occur as a result of such a bubble phenomenon, which in normal room conditions requires zero-to-peak acoustic pressures of order 1 bar in order to cause inertial cavitation, but instead, lower amplitude acoustic fields are used to generate non-inertial bubble pulsations and optionally surface waves on the walls of some bubbles. It is these surface waves and the associated liquid motion which is utilized in the pore cleaning employed in the preferred aspects of the present invention. However, the present invention further provides that, in addition to cleaning using non-inertial cavitation, inertial cavitation can additionally be achieved as well as non-inertial cavitation to put the power of a cleaning bath, which would include inertial cavitation and jetting, onto the end of a hosepipe stream of water and clean from a distance (e.g to power clean the nooks and crannies of an aircraft engine that cannot be immersed in a cleaning bath or to decontaminate a hospital ward). That is an immensely powerful cleaning method.

As discussed further below, the invention can nevertheless be modified additionally to provide such inertial collapse on particularly robust surfaces.

In accordance with the preferred aspects of the present invention, the bubbles are independently generated at a location remote from the surface to be cleaned, driven towards the surface to be cleaned within a fluid flow, and excited by acoustic energy at the surface so as to provide, enhanced cleaning efficacy over the surface, particularly, when the surface has a three dimensional characteristic, including pores, recesses, cavities or crevices, and inside pipes and tubes.

In accordance with the preferred aspects of the present invention, a sufficient acoustic pressure amplitude is developed at the surface in question without the requirement for generation of inertial collapse on the interface, although the invention can be modified additionally to provide such inertial collapse on particularly robust surfaces. This will drive surface waves and suitable bubble oscillation to clean the interface and associated structure without causing the damage and erosion which can potentially occur when inertial cavitation or the generation of high-speed jets through bubbles are excited very close to or at a solid surface. Any bubble entrapment into crevices aids cleaning: the sound field used in the embodiments aids transport of bubbles from the bulk liquid to the target surface, and then attracts suitable bubbles into the crevice as a result of acoustic radiation forces. Having been trapped in the pore, these bubbles effectively empty/clean the cavity in question. A sufficient bubble population should be provided or delivered to the surface of the materials for cleaning. This is to enable bubble excitation at the solid/liquid interface driven by the targeted acoustic field of the apparatus in question.

Considering the acoustic transmission for a flow system, it is desirable to match the boundary conditions at the nozzle (and horn) with those in the stream once it has left the nozzle. In the specific example where the liquid stream passes through a gas space on leaving the nozzle, it is desirable to achieve a pressure release condition over the walls of the flow system and to operate above the 'cut off' frequency of at least one mode (which cannot be the plane wave mode because this mode is evanescent at all frequencies for pressure-release walls), and that cut-off frequency being determined by the aperture, but is different for each mode even though all have the same aperture. However, the plane wave mode (which cannot propagate in a liquid stream flowing through gas but can propagate down an enclosed tube) can exist at all frequencies in a rigid walled tube. It has been found that sound transmission down a suitable liquid stream can be facilitated in several ways.

First, the frequency of the sound field applied is chosen to be greater than the cutoff frequency of at least one propagating mode (preferably more) for acoustic propagation along the liquid stream. Second, bubble induced perturbation of the system can enable sound transmission through the liquid stream. Third, amplitude or frequency modulated sound can be used to increase acoustic pressure at the surface of the object to be cleaned and hence achieve bubble oscillation.

The flow rate and nozzle design are preferably chosen so that the liquid stream does not lose integrity before it reaches the target (e.g. break up into drops, entrain bubbles etc.) to the extent that it hinders the transmission of sound from the nozzle to the target. Symmetrical nozzle designs and low flow rates are one preferred way of achieving this objective. Although the chamber upstream of the nozzle is, in the preferred embodiments, substantially conical in shape, in other embodiments the chamber may have a different shape provided that the acoustic energy is imparted into the liquid flow at the desired boundary condition for the particular cleaning application.

Preferably, the apparatus is adapted electrochemically to generate a swarm of appropriately sized bubbles, and then to transfer that swarm, through the fluid flow in the stream, to the surface to be cleaned in the absence of acoustically driven bubble coalescence. Then, the acoustic energy is provided to acoustically excite motion/surface waves on the bubbles in the swarm at the target substrate.

The seeding of bubbles into the flow assists cleaning by: perturbing the system to facilitate sound transmission into the liquid stream; perturbing the sound speed to facilitate sound transmission into the liquid stream; perturbing the acoustic impedance in the liquid to facilitate sound transmission into the liquid stream; perturbing the fluid loading to facilitate sound transmission into the liquid stream; providing bubbles which are transported to the target where those bubbles undertake cleaning; and addition of surfactant to the liquid which can affect the achievement of a stable bubble diameter without bubble coalescence.

The preferred embodiments of the present invention can provide enhanced cleaning of items or objects such as, for example, surgical equipment and prostheses, tools, product components (e.g. microchips), foodstuffs, packing, moulds, materials and packaging for pharmaceuticals, laboratory equipment, and forensic equipment. Infrastructure and facilities (e.g. hospitals ward rooms and their keyboards, telephones; abattoirs; nuclear and chemical facilities etc.) and personnel (e.g. under fingernails for surgeons, for cleaning of personnel or vehicles contaminated by biological, chemical or nuclear hazard etc.) are also suitable applications.

Examples of items which would particularly benefit from the 'liquid stream' manifestation of the preferred embodiments of the present invention (e.g. fitted to a hose or tap) include: vehicles, domestic products (in the home and in the show-room or factory), human hands; optical lenses; surfaces with specialised and delicate coatings, e.g. Teflon (Registered Trade Mark) coatings on non-stick frying pans or optical coatings on lenses; and for cleaning (e.g. through biofilm removal) without damage of items before surgical implantation, such as implants, prostheses, organs, etc.

Such cleaning can be achieved without any abrasive particles, just a stream of liquid containing gas bubbles. Abrasion and damage degrade components and make subsequent contamination (e.g. growth of biofilms) more likely and furthermore make subsequent cleaning more difficult.

The portability and conservation characteristics of the cleaning apparatus of the preferred embodiments of the present invention make it particularly convenient for the decontamination and cleaning of buildings (or other facilities where the target cannot be immersed, or where it is preferably not to transport it to a specialist cleaning facility), either as part of the scheduled cleaning routine (e.g. for abattoirs, hospitals, factories etc.) or as a tool for the decontamination of large facilities (e.g. in the decommissioning of chemical and nuclear plants, or areas contaminated as a result of terrorist or military action).

A liquid stream technology as employed in the preferred embodiments of the present invention is particularly attractive for cleaning rooms, corridors, and fixed installations. Living material (personnel, animals) could also be decontaminated using this invention, where portability (or the incorporation of the invention into existing shower or hose facilities) eliminates the delay which would be incurred transporting a contaminated person to a non-portable decontamination facility.

What is claimed is:

1. An apparatus comprising:

a hollow body comprising a rear wall positioned at a rear of the hollow body and a conical element extending forward from the rear wall to an outlet at a front end of the hollow body, the conical element and the rear wall defining a cavity configured to contain a liquid, the conical element having a conical wall having a circular cross-sectional shape, wherein the conical wall, as seen from inside the conical element, has a concavely curved segment having a first diameter and a convexly curved segment having a second diameter that is smaller than the first diameter and being located between the concavely curved segment and the front end, with a nozzle comprising a nozzle body located at the outlet at the front end of the conical element and configured to receive the liquid from the conical element, and a nozzle outlet configured to discharge a stream of the liquid toward a surface;

an inlet conduit configured to supply an inlet stream of the liquid;

a manifold located at the rear of the hollow body and connected to the inlet conduit to receive the inlet stream, the manifold having a plurality of secondary conduits defining a plurality of inlet flow passages, such that the manifold is configured to divide the inlet stream into the plurality of inlet flow passages, wherein the plurality of secondary conduits are connected to a plurality of inlets positioned at different locations at the rear of the hollow body, each of the inlets being in fluid communication with the hollow body, such that the manifold is configured to introduce the liquid into the cavity defined by the hollow body through the plurality of inlet flow passages and the plurality of inlets;

a common housing containing the rear wall, the conical element of the hollow body, and the manifold, such that the rear wall, the conical element, and the manifold are connected together within the common housing, and the nozzle outlet is configured to discharge the stream of the liquid out of the common housing;

an acoustic transducer positioned at the rear wall, the acoustic transducer configured to generate acoustic energy and to introduce the acoustic energy into the liquid contained in the conical element; and a controller configured for controlling the acoustic transducer to generate the acoustic energy by generating pulses of the acoustic energy, wherein the plurality of inlets are located such that the plurality of inlets are configured for introducing the inlet stream into the cavity adjacent to an inner surface of the rear wall and in front of the acoustic transducer.

2. The apparatus of claim 1, wherein the controller is configured for switching the acoustic transducer on and off intermittently to generate the pulses of the acoustic energy.

3. The apparatus of claim 1, wherein the apparatus includes a modulator configured for modulating an output of the acoustic transducer to generate the pulses of the acoustic energy.

4. The apparatus of claim 1, further comprising:

a surfactant injector configured to inject surfactant into the stream, thereby controlling a surfactant concentration in the stream.

5. The apparatus of claim 1, wherein a shape of the conical element assists transmission of the acoustic energy from the conical element to the stream flowing into and through the nozzle and avoids an impedance mismatch between the acoustic energy in the stream flowing through the conical element and the acoustic energy of the stream exiting the nozzle outlet.

6. The apparatus of claim 1, wherein the conical element is composed of a material that can function as a pressure release interface when fluid is directed thereagainst.

7. The apparatus of claim 1, wherein the acoustic transducer is configured to generate the acoustic energy as amplitude or frequency modulated acoustic energy based on a configuration of a modulator.

8. The apparatus of claim 1, further comprising a device for monitoring cleaning of the surface, the device comprising first and second electrodes, forming an electrochemical cell, adapted to be respectively located at a portion of the surface and interconnected by a resistance measuring apparatus.

9. The apparatus of claim 1, wherein the acoustic transducer has a face adjacent to the rear wall, and the rear wall is circular.

10. The apparatus of claim 9, wherein the manifold is configured such that the plurality of inlets are distributed around a circumference of the rear wall and in front of the face of the acoustic transducer.

* * * * *